(12) United States Patent
Ding et al.

(10) Patent No.: US 9,384,285 B1
(45) Date of Patent: Jul. 5, 2016

(54) METHODS FOR IDENTIFYING RELATED DOCUMENTS

(71) Applicants: Yiyang Joy Ding, New York, NY (US); Kelvin Chan, New York, NY (US)

(72) Inventors: Yiyang Joy Ding, New York, NY (US); Kelvin Chan, New York, NY (US)

(73) Assignee: GOOGLE INC., Mountain View, CA (US)

( * ) Notice: Subject to any disclaimer, the term of this patent is extended or adjusted under 35 U.S.C. 154(b) by 102 days.

(21) Appl. No.: 13/717,788

(22) Filed: Dec. 18, 2012

(51) Int. Cl.
*G06F 17/30* (2006.01)

(52) U.S. Cl.
CPC .... *G06F 17/30867* (2013.01); *G06F 17/30705* (2013.01); *G06F 17/30864* (2013.01)

(58) Field of Classification Search
CPC ............ G06F 17/30864; G06F 17/30705; G06F 17/30731; G06F 17/273; G06F 17/30011; G06F 17/30539; G06F 17/30; G06F 17/30528; G06F 17/5031
USPC .................................. 707/737, 769
See application file for complete search history.

(56) References Cited

U.S. PATENT DOCUMENTS

| | | | |
|---|---|---|---|
| 5,280,367 A | 1/1994 | Zuniga | |
| 5,448,695 A | 9/1995 | Douglas et al. | |
| 5,544,049 A | 8/1996 | Henderson et al. | |
| 5,600,778 A | 2/1997 | Swanson et al. | |
| 5,613,163 A | 3/1997 | Marron et al. | |
| 5,721,849 A | 2/1998 | Amro | |
| 5,790,127 A | 8/1998 | Anderson et al. | |
| 5,821,928 A | 10/1998 | Melkus et al. | |
| 5,826,015 A | 10/1998 | Schmidt | |
| 5,845,300 A | 12/1998 | Comer et al. | |
| 5,859,640 A | 1/1999 | de Judicibus | |
| 5,877,763 A | 3/1999 | Berry et al. | |
| 5,883,626 A | 3/1999 | Glaser et al. | |
| 5,905,991 A | 5/1999 | Reynolds | |
| 5,966,121 A * | 10/1999 | Hubbell et al. | ................ 715/726 |
| 6,005,575 A | 12/1999 | Colleran et al. | |
| 6,018,341 A | 1/2000 | Berry et al. | |
| 6,272,490 B1 | 8/2001 | Yamakita | |
| 6,295,542 B1 | 9/2001 | Corbin | |
| 6,301,573 B1 | 10/2001 | McIlwaine et al. | |
| 6,377,965 B1 | 4/2002 | Hachamovitch et al. | |
| 6,421,678 B2 | 7/2002 | Smiga et al. | |

(Continued)

FOREIGN PATENT DOCUMENTS

WO WO2012057726 5/2012
WO WO2014072767 A1 5/2014

OTHER PUBLICATIONS

Ashman. "Electronic Document Addressing: Dealing with Change." ACM Computing Surveys, vol. 32, No. 3, Sep. 2000, pp. 201-212.

(Continued)

*Primary Examiner* — Shahid Alam
*Assistant Examiner* — Andalib Lodhi
(74) *Attorney, Agent, or Firm* — Young Basile Hanlon & MacFarlane, P.C.

(57) ABSTRACT

A method includes storing two or more documents at a storage system that is associated with a document editing system and receiving usage pattern information regarding each document from the two or more documents. The method also includes determining a likelihood that the two or more documents are related documents based at least in part on the usage pattern information and defining a collection including the two or more documents if the likelihood that the two or more documents are related exceeds a threshold value.

17 Claims, 7 Drawing Sheets

(56) References Cited

U.S. PATENT DOCUMENTS

| | | |
|---|---|---|
| 6,463,078 B1 | 10/2002 | Engstrom et al. |
| 6,546,393 B1 | 4/2003 | Khan |
| 6,564,213 B1 | 5/2003 | Ortega et al. |
| 6,647,383 B1 | 11/2003 | August et al. |
| 6,654,038 B1 | 11/2003 | Gajewska et al. |
| 6,751,604 B2 | 6/2004 | Barney et al. |
| 6,789,251 B1 | 9/2004 | Johnson |
| 6,820,075 B2 | 11/2004 | Shanahan et al. |
| 6,865,714 B1 | 3/2005 | Liu et al. |
| 6,889,337 B1 | 5/2005 | Yee |
| 6,907,447 B1 | 6/2005 | Cooperman et al. |
| 6,980,977 B2 | 12/2005 | Hoshi et al. |
| 7,003,506 B1 | 2/2006 | Fisk et al. |
| 7,003,737 B2 | 2/2006 | Chiu et al. |
| 7,031,963 B1 | 4/2006 | Bae |
| 7,051,277 B2 | 5/2006 | Kephart et al. |
| 7,073,129 B1 | 7/2006 | Robarts et al. |
| 7,103,835 B1 | 9/2006 | Yankovich et al. |
| 7,127,674 B1 | 10/2006 | Carroll et al. |
| 7,146,422 B1 | 12/2006 | Marlatt et al. |
| 7,295,995 B1 | 11/2007 | York et al. |
| 7,353,252 B1 | 4/2008 | Yang et al. |
| 7,353,397 B1 | 4/2008 | Herbach |
| 7,370,274 B1 | 5/2008 | Stuple et al. |
| 7,380,218 B2 | 5/2008 | Rundell |
| 7,386,789 B2 | 6/2008 | Chao et al. |
| 7,392,249 B1 | 6/2008 | Harris et al. |
| 7,395,507 B2 | 7/2008 | Robarts et al. |
| 7,406,659 B2 | 7/2008 | Klein et al. |
| 7,451,389 B2 | 11/2008 | Huynh et al. |
| 7,480,715 B1 | 1/2009 | Barker et al. |
| 7,487,145 B1 | 2/2009 | Gibbs et al. |
| 7,499,919 B2 | 3/2009 | Meyerzon et al. |
| 7,499,940 B1 | 3/2009 | Gibbs |
| 7,647,312 B2 | 1/2010 | Dai |
| 7,664,786 B2 | 2/2010 | Oh et al. |
| 7,685,144 B1 | 3/2010 | Katragadda |
| 7,685,516 B1 | 3/2010 | Fischer |
| 7,716,236 B2 | 5/2010 | Sidhu et al. |
| 7,734,627 B1 | 6/2010 | Tong |
| 7,756,935 B2 | 7/2010 | Gaucas |
| 7,761,788 B1 | 7/2010 | McKnight et al. |
| 7,769,579 B2 | 8/2010 | Zhao et al. |
| 7,774,328 B2 | 8/2010 | Hogue et al. |
| 7,779,355 B1 | 8/2010 | Erol et al. |
| 7,783,965 B1 | 8/2010 | Dowd et al. |
| 7,818,678 B2 | 10/2010 | Massand |
| 7,836,044 B2 | 11/2010 | Kamvar et al. |
| 7,917,848 B2 | 3/2011 | Harmon et al. |
| 8,020,003 B2 | 9/2011 | Fischer |
| 8,020,112 B2 | 9/2011 | Ozzie et al. |
| 8,027,974 B2 | 9/2011 | Gibbs |
| 8,051,088 B1 | 11/2011 | Tibbetts et al. |
| 8,086,960 B1 | 12/2011 | Gopalakrishna et al. |
| 8,091,020 B2 | 1/2012 | Kuppusamy et al. |
| 8,117,535 B2 * | 2/2012 | Beyer et al. .................. 715/234 |
| 8,185,448 B1 | 5/2012 | Myslinski |
| 8,224,802 B2 | 7/2012 | Hogue |
| 8,229,795 B1 | 7/2012 | Myslinski |
| 8,239,751 B1 | 8/2012 | Rochelle et al. |
| 8,260,785 B2 | 9/2012 | Hogue et al. |
| 8,261,192 B2 | 9/2012 | Djabarov |
| 8,346,620 B2 | 1/2013 | King et al. |
| 8,346,877 B2 | 1/2013 | Turner |
| 8,359,550 B2 | 1/2013 | Meyer et al. |
| 8,370,275 B2 | 2/2013 | Bhattacharya et al. |
| 8,386,914 B2 | 2/2013 | Baluja et al. |
| 8,453,066 B2 | 5/2013 | Ozzie et al. |
| 8,458,046 B2 | 6/2013 | Myslinski |
| 8,572,388 B2 | 10/2013 | Boemker et al. |
| 8,595,174 B2 | 11/2013 | Gao et al. |
| 8,621,222 B2 | 12/2013 | Das |
| 8,666,961 B1 | 3/2014 | Qureshi et al. |
| 8,667,394 B1 | 3/2014 | Spencer |
| 8,782,516 B1 | 7/2014 | Dozier |
| 8,799,765 B1 | 8/2014 | MacInnis et al. |
| 8,856,640 B1 | 10/2014 | Barr et al. |
| 8,856,645 B2 | 10/2014 | Vandervort et al. |
| 8,904,284 B2 | 12/2014 | Grant et al. |
| 2001/0025287 A1 | 9/2001 | Okabe et al. |
| 2002/0010725 A1 | 1/2002 | Mo |
| 2002/0029337 A1 | 3/2002 | Sudia et al. |
| 2002/0035714 A1 | 3/2002 | Kikuchi et al. |
| 2002/0069223 A1 | 6/2002 | Goodisman et al. |
| 2002/0070977 A1 | 6/2002 | Morcos et al. |
| 2002/0103914 A1 | 8/2002 | Dutta et al. |
| 2002/0129100 A1 | 9/2002 | Dutta et al. |
| 2002/0152255 A1 | 10/2002 | Smith, Jr. et al. |
| 2002/0161839 A1 | 10/2002 | Colasurdo et al. |
| 2002/0187815 A1 | 12/2002 | Deeds et al. |
| 2003/0046263 A1 | 3/2003 | Castellanos et al. |
| 2003/0058286 A1 | 3/2003 | Dando |
| 2003/0069877 A1 | 4/2003 | Grefenstette et al. |
| 2003/0156130 A1 | 8/2003 | James et al. |
| 2003/0172353 A1 | 9/2003 | Cragun |
| 2003/0200192 A1 | 10/2003 | Bell et al. |
| 2003/0234822 A1 | 12/2003 | Spisak |
| 2004/0061716 A1 | 4/2004 | Cheung et al. |
| 2004/0062213 A1 | 4/2004 | Koss |
| 2004/0122846 A1 | 6/2004 | Chess et al. |
| 2004/0139465 A1 | 7/2004 | Matthews, III et al. |
| 2004/0140901 A1 | 7/2004 | Marsh |
| 2004/0145607 A1 | 7/2004 | Alderson |
| 2004/0153973 A1 | 8/2004 | Horwitz |
| 2004/0164991 A1 | 8/2004 | Rose |
| 2004/0177319 A1 | 9/2004 | Horn |
| 2005/0024487 A1 | 2/2005 | Chen |
| 2005/0028081 A1 | 2/2005 | Arcuri et al. |
| 2005/0034060 A1 | 2/2005 | Kotler et al. |
| 2005/0039191 A1 | 2/2005 | Hewson et al. |
| 2005/0044132 A1 | 2/2005 | Campbell et al. |
| 2005/0044369 A1 | 2/2005 | Anantharaman |
| 2005/0055416 A1 | 3/2005 | Heikes et al. |
| 2005/0120308 A1 | 6/2005 | Gibson et al. |
| 2005/0144162 A1 | 6/2005 | Liang |
| 2005/0144573 A1 | 6/2005 | Moody et al. |
| 2005/0160065 A1 | 7/2005 | Seeman |
| 2005/0183001 A1 | 8/2005 | Carter et al. |
| 2005/0183006 A1 | 8/2005 | Rivers-Moore et al. |
| 2005/0198589 A1 | 9/2005 | Heikes et al. |
| 2005/0210256 A1 | 9/2005 | Meier et al. |
| 2005/0246653 A1 | 11/2005 | Gibson et al. |
| 2006/0005142 A1 | 1/2006 | Karstens |
| 2006/0010865 A1 | 1/2006 | Walker |
| 2006/0041836 A1 * | 2/2006 | Gordon et al. ................ 715/513 |
| 2006/0047682 A1 | 3/2006 | Black et al. |
| 2006/0080303 A1 | 4/2006 | Sargent et al. |
| 2006/0106778 A1 | 5/2006 | Baldwin |
| 2006/0136552 A1 | 6/2006 | Krane et al. |
| 2006/0150087 A1 | 7/2006 | Cronenberger et al. |
| 2006/0190435 A1 | 8/2006 | Heidloff et al. |
| 2006/0213993 A1 | 9/2006 | Tomita |
| 2006/0248070 A1 | 11/2006 | Dejean et al. |
| 2007/0005581 A1 | 1/2007 | Arrouye et al. |
| 2007/0005590 A1 | 1/2007 | Yuan et al. |
| 2007/0033200 A1 | 2/2007 | Gillespie |
| 2007/0143317 A1 | 6/2007 | Hogue et al. |
| 2007/0150800 A1 | 6/2007 | Betz et al. |
| 2007/0156761 A1 | 7/2007 | Smith |
| 2007/0162907 A1 | 7/2007 | Herlocker |
| 2007/0168355 A1 | 7/2007 | Dozier et al. |
| 2007/0198952 A1 | 8/2007 | Pittenger |
| 2007/0220259 A1 | 9/2007 | Pavlicic |
| 2007/0280205 A1 | 12/2007 | Howell et al. |
| 2007/0291297 A1 | 12/2007 | Harmon et al. |
| 2008/0022107 A1 | 1/2008 | Pickles et al. |
| 2008/0028284 A1 | 1/2008 | Chen |
| 2008/0034213 A1 | 2/2008 | Boemker et al. |
| 2008/0059539 A1 | 3/2008 | Chin et al. |
| 2008/0077571 A1 * | 3/2008 | Harris .............. G06F 17/30864 |
| 2008/0082907 A1 | 4/2008 | Sorotokin et al. |
| 2008/0120319 A1 | 5/2008 | Drews et al. |

(56) References Cited

U.S. PATENT DOCUMENTS

| | | | |
|---|---|---|---|
| 2008/0172608 A1 | 7/2008 | Patrawala et al. | |
| 2008/0208969 A1* | 8/2008 | Van Riel | 709/204 |
| 2008/0239413 A1 | 10/2008 | Vuong et al. | |
| 2008/0320397 A1 | 12/2008 | Do et al. | |
| 2009/0006936 A1 | 1/2009 | Parker et al. | |
| 2009/0013244 A1 | 1/2009 | Cudich et al. | |
| 2009/0044143 A1 | 2/2009 | Karstens | |
| 2009/0044146 A1 | 2/2009 | Patel et al. | |
| 2009/0083245 A1 | 3/2009 | Ayotte et al. | |
| 2009/0094178 A1* | 4/2009 | Aoki | 706/20 |
| 2009/0132560 A1 | 5/2009 | Vignet | |
| 2009/0192845 A1 | 7/2009 | Gudipaty et al. | |
| 2009/0198670 A1 | 8/2009 | Shiffer et al. | |
| 2009/0204818 A1 | 8/2009 | Shin et al. | |
| 2009/0282144 A1 | 11/2009 | Sherrets et al. | |
| 2009/0292673 A1 | 11/2009 | Carroll | |
| 2010/0070448 A1 | 3/2010 | Omoigui | |
| 2010/0070881 A1 | 3/2010 | Hanson et al. | |
| 2010/0076946 A1 | 3/2010 | Barker et al. | |
| 2010/0100743 A1 | 4/2010 | Ali et al. | |
| 2010/0121888 A1 | 5/2010 | Cutting et al. | |
| 2010/0131523 A1 | 5/2010 | Yu et al. | |
| 2010/0180200 A1 | 7/2010 | Donneau-Golencer et al. | |
| 2010/0191744 A1* | 7/2010 | Meyerzon et al. | 707/749 |
| 2010/0198821 A1 | 8/2010 | Loritz et al. | |
| 2010/0223541 A1 | 9/2010 | Clee et al. | |
| 2010/0251086 A1 | 9/2010 | Haumont et al. | |
| 2010/0268700 A1* | 10/2010 | Wissner et al. | 707/706 |
| 2010/0269035 A1 | 10/2010 | Meyer et al. | |
| 2010/0275109 A1 | 10/2010 | Morrill | |
| 2010/0281353 A1 | 11/2010 | Rubin | |
| 2011/0016106 A1 | 1/2011 | Xia | |
| 2011/0023022 A1 | 1/2011 | Harper et al. | |
| 2011/0043652 A1 | 2/2011 | King et al. | |
| 2011/0060584 A1 | 3/2011 | Ferrucci et al. | |
| 2011/0072338 A1 | 3/2011 | Caldwell | |
| 2011/0082876 A1* | 4/2011 | Lu et al. | 707/769 |
| 2011/0087973 A1 | 4/2011 | Martin et al. | |
| 2011/0126093 A1 | 5/2011 | Ozzie et al. | |
| 2011/0173210 A1 | 7/2011 | Ahn et al. | |
| 2011/0179378 A1 | 7/2011 | Wheeler et al. | |
| 2011/0191276 A1 | 8/2011 | Cafarella et al. | |
| 2011/0209064 A1 | 8/2011 | Jorgensen et al. | |
| 2011/0209075 A1 | 8/2011 | Wan | |
| 2011/0219291 A1 | 9/2011 | Lisa | |
| 2011/0225482 A1 | 9/2011 | Chan et al. | |
| 2011/0225490 A1 | 9/2011 | Meunier | |
| 2011/0252312 A1 | 10/2011 | Lemonik et al. | |
| 2011/0276538 A1 | 11/2011 | Knapp et al. | |
| 2011/0296291 A1 | 12/2011 | Melkinov et al. | |
| 2011/0306028 A1 | 12/2011 | Galimore | |
| 2012/0078826 A1 | 3/2012 | Ferrucci et al. | |
| 2012/0084644 A1 | 4/2012 | Robert et al. | |
| 2012/0095979 A1 | 4/2012 | Aftab et al. | |
| 2012/0116812 A1 | 5/2012 | Boone et al. | |
| 2012/0124053 A1 | 5/2012 | Ritchford et al. | |
| 2012/0166924 A1 | 6/2012 | Larson et al. | |
| 2012/0185473 A1 | 7/2012 | Ponting et al. | |
| 2012/0203734 A1* | 8/2012 | Spivack et al. | 707/602 |
| 2012/0226646 A1 | 9/2012 | Donoho et al. | |
| 2012/0254730 A1 | 10/2012 | Sunderland et al. | |
| 2012/0284602 A1 | 11/2012 | Seed et al. | |
| 2012/0304046 A1 | 11/2012 | Neill et al. | |
| 2012/0317046 A1 | 12/2012 | Myslinski | |
| 2013/0036344 A1 | 2/2013 | Ahmed et al. | |
| 2013/0041685 A1 | 2/2013 | Yegnanarayanan | |
| 2013/0132566 A1 | 5/2013 | Olsen et al. | |
| 2013/0165086 A1 | 6/2013 | Doulton | |
| 2013/0212062 A1 | 8/2013 | Levy et al. | |
| 2013/0246346 A1 | 9/2013 | Khosrowshahi et al. | |
| 2013/0268830 A1 | 10/2013 | Khosrowshahi et al. | |
| 2014/0006399 A1 | 1/2014 | Vasudevan et al. | |
| 2014/0013197 A1 | 1/2014 | McAfee et al. | |
| 2014/0032913 A1 | 1/2014 | Tenenboym et al. | |
| 2014/0040249 A1 | 2/2014 | Ploesser et al. | |
| 2014/0236958 A1 | 8/2014 | Vaughn | |

OTHER PUBLICATIONS

Electronic Signatures and Infrastructures ESI; PDF Advanced Electronic Signature Profiles; Part 4: PAdES Long Ter PAdES-LTV Profile, ETSI TS 102 778-4, V1.1.1, Jul. 2009, 19 pages.

Fox. "Maps API Blog: Creating Dynamic Client-side Maps Mashups with Google Spreadsheets." Mar. 2007, [retrieved on Dec. 5, 2011]. Retrieved from the Internet: <URL:http://googlemapsapi.blogspot.com/2007/03/creating-dynamic-client-side-maps.html>. 2 pages.

GeekRant.org [online]. "How to Embed a Word Document in Another Word Document," Sep. 14, 2005, [retrieved on Dec. 5, 2011]. Retrieved from the Internet: <URL:http://www.geekrant.org/2005/09/14/word-embed-document/>. 6 pages.

Herrick. "Google this Using Google Apps for Collaboration and Productivity." Proceedings of the ACM Siguccs Fall Conference on User Services Conference, Siguccs '09, Jan. 2009, p. 55.

https://en.wikipedia.org/wiki/Backus%E2%80%93Naur_Form, as of Jul. 14, 2013.

https://en.wikipedia.org/wiki/Regular_expression, as of Sep. 2, 2013.

ISR and Written Opinion of the International Searching Authority in PCT Application No. PCT/US2011/037862, dated Oct. 31, 2011, 64 pages.

Kappe. "Hyper-G: A Distributed Hypermedia System." Proceedings of the International Networking Conference, 1993, [retrieved on Oct. 20, 2011]. Retrieved from the Internet: <URL:http://ftp.iicm.tugraz.at/pub/papers/inet93.pdf>. 9 pages.

Kircher. "Lazy Acquisition." Proceedings of the 6th European Conference on Pattern Languages of Programs, Jul. 2011, pp. 1-11.

Microsoft Support [online]. "How to Embed and Automate Office Documents with Visual Basic," Mar. 27, 2007, [retrieved on Dec. 5, 2011]. Retrieved from the Internet: <URLhttp://support.microsoft.com/kb/242243>. 6 pages.

Microsoft Support [online]. "OLE Concepts and Requirements Overview," Oct. 27, 1999, [retrieved on Dec. 2, 2011]. Retrieved from the Internet: <URL:http://support.microsoft.com/kb/86008>. 3 pages.

Oracle Provider for OLE DB—Developer's Guide. 10g Release 1 (10.1) Dec. 2003, Oracle Corp., 90 pages.

Pinkas et al. "CMS Advanced Electrponic Signatures," Request for Comments 5126, Feb. 2008, 142 pages.

WebArchive [online]. "Supplementary Notes for MFC Programming Module 23 and Module 27: Interfaces, com.com + and OLE" in: http://www.tenouk.com/visualcplusmfc/mfcsupp/ole.html, Jan. 6, 2008, [retrieved on Dec. 5, 2011]. Retrieved from the Internet: <URL:http://web.archive.org/web/20091125073542/http://www.tenouk.com/visualcplusmfc/mfcsupp/ole.html>. 4 pages.

"Bohman, P. ""Introduction to Web Accessibility"", Oct. 2003, ebAIM, printed Apr. 17, 2004,<http://www.webaim.org/intro/?templatetype=3> (p. 1-6)".

"Caldwell et al., ""Web Content Accessibility Guidelines 2.0, W3C Working Draft Mar. 11, 2004""", Mar. 11, 2004, WorldWide Web Consortium (p. 1-56)".

FraxNCik, E., Computer-& screen-based interfaces: Universal design filter, Human Factors Engineering, Pacific Bell Version 2, Jun. 6, 1996.

Griesser, A., "A generic editor Full text," pp. 50-55, 1997 ACM Press NewYork, NY, USA.

Jacobs, Ian, et al., "User Agent Accessibility Guidelines 1.0, W3C Recommendation Dec. 17, 2002", World Wide Web Consortium, 115 pages.

Jourdan, Guy-Vincent, CSI 3140 WWW Structures, Techniques and Standards, Cascading Style Sheets, power point slides, published Feb. 16, 2010.

Treviranus, Jutta, et al., "Authoring Tool Accessibility Guidelines 1.0, W3C Recommendation Feb. 3, 2000", World Wide Web Consortium (p. 1-22).

(56) References Cited

OTHER PUBLICATIONS

W3C, Cascading Style sheets Level 2 Revision 1 Specification, Apr. 15, 2011, 487 pages.
Herb Tyson, Microsoft Word 2010 Bible, John Wiley & Sons, pp. 221, 757, 833, Jun. 21, 2010.
David Sawyer McFarland, "CSS the missing manual", O'Reilly, Aug. 2009, pp. 7-101, 134-138, 428-429.
Timestamp from Wikipedia, accessed from https://en.wikipedialcorg/wiki/Timestamp, archived by WaybackMachine on Sep. 15, 2012, pp. 1-2.

* cited by examiner

METHODS FOR IDENTIFYING RELATED DOCUMENTS

BACKGROUND

The disclosure herein relates generally to identifying related documents. In file systems and other types of electronic document storage systems, users often spend a lot of time curating their documents. One example of a way in which users curate documents is by organizing the documents into collections. For example, a user may place a group of related documents in a folder, and give the folder a meaningful title that describes the documents.

Previous document storage systems have implemented many different types of collections. Examples of collections include folder based collections, tag based collections, and keyword based collections. In some document storage systems, a document can be a part of only one collection, while in other document storage systems, a document can be a part of multiple collections. A common goal of many types of collections, however, is to group related documents.

Some previous efforts have attempted to automatically group related documents based on words or phrases that appear in the documents or in their titles. Although the presence of common words or phrases in a group of documents may provide some insight as to whether those documents are related, false positive results may be generated in situations where a user's documents include unrelated documents that are directed to similar subject matter, and related documents may not always include common keywords.

SUMMARY

The disclosure relates to identifying related documents.

One aspect of the disclosed embodiments is a method that includes receiving, at a storage system, usage pattern information regarding each document from two or more documents that are stored at the storage system. The method also includes determining whether the two or more documents are likely to be related documents based at least in part on the usage pattern information. The method also includes defining, at the storage system, a collection including the two or more documents if it is determined that the documents are likely to be related documents.

Another aspect of the disclosed embodiments is a storage medium including program instructions that are executable by one or more processors. When executed, the program instructions cause the one or more processors to perform operations. The operations include receiving, at a storage system, usage pattern information regarding each document from two or more documents that are stored at the storage system. The operations also include determining whether the two or more documents are likely to be related documents based at least in part on the usage pattern information. The operations also include defining, at the storage system, a collection including the two or more documents if it is determined that the documents are likely to be related documents.

Another aspect of the disclosed embodiments is an apparatus that includes one or more processors; and one or more memory devices for storing program instructions used by the one or more processors. The program instructions, when executed by the one or more processors, cause the one or more processors to receive usage pattern information regarding each document from two or more documents that are stored at a storage system, determine whether the two or more documents are likely to be related documents based at least in part on the usage pattern information, and define, at the storage system, a collection including the two or more documents if it is determined that the documents are likely to be related documents.

BRIEF DESCRIPTION OF THE DRAWINGS

The description herein makes reference to the accompanying drawings wherein like reference numerals refer to like parts throughout the several views, and wherein.

DETAILED DESCRIPTION

The disclosure herein relates identifying related documents based on usage pattern information. When working on a project or task, users often create, edit, or view multiple documents that are related to the project or task. During a relatively short time period, the user may simultaneously open two or more documents, switch back and forth between two or more documents, perform copy and paste operations between two or more documents, or engage in other similar usage patterns that can be used as a basis for inferring that the documents are related. As examples, the usage pattern information can include information representing transactions or events that occur with respect to the documents by one or more users, such as creating, accessing, viewing, and editing the documents. The usage pattern information can be used in isolation to determine whether documents are related, or can be combined with other signals that provide a basis for inferring that the documents are related. The other signals can include, but are not limited to, the content of the documents, and the identities of persons who have been granted access to view and/or modify the documents in the context of a shared workspace in which documents are edited collaboratively.

Figure 1:
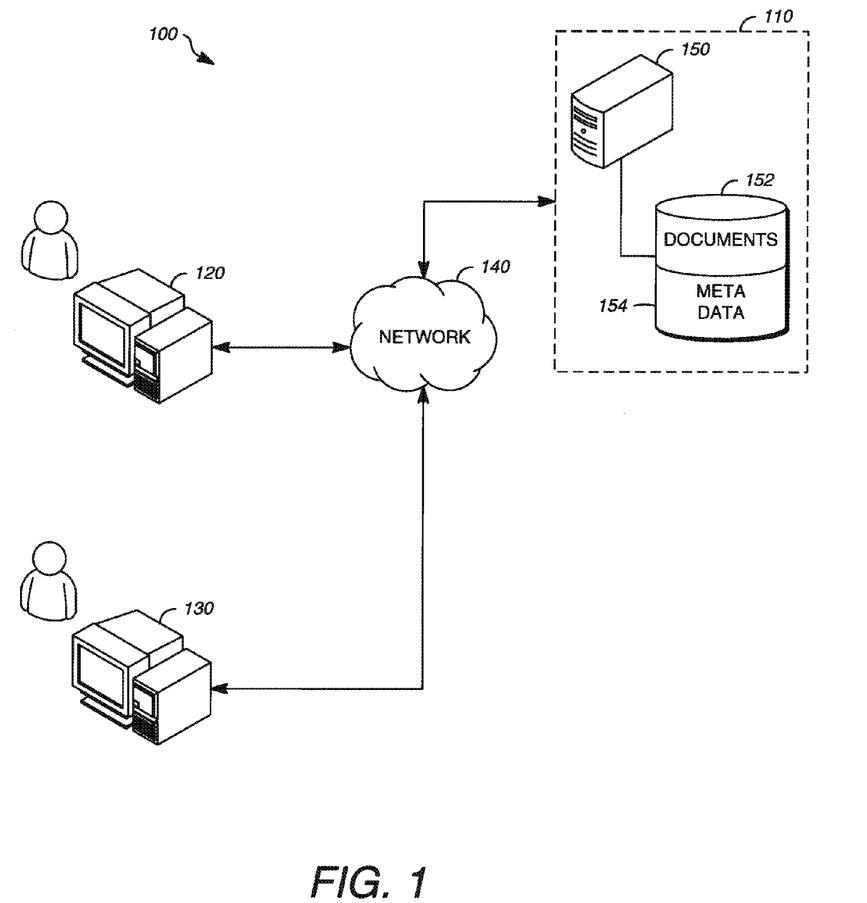
FIG. 1 is a block diagram showing an example of a network environment that includes a document storage and editing system.

FIG. 1 is a block diagram that shows an example of an environment 100 that includes a document storage and editing system 110. The environment can include a user system 120, and one or more third-party user systems 130 that are in communication with the document storage and editing system 110 via a network 140. The user system 120 and the third-party user systems 130 can each be any manner of computer or computing device, such as a desktop computer, a laptop computer, a tablet computer, or a smart-phone (a computationally-enabled mobile telephone). The document storage and editing system 110 can include one or more server computers such as a host computing device 150. The user system 120, the third-party user systems 130, and the document storage and editing system 110 can each be implemented as a single system, multiple systems, distributed systems, or in any other form. The network 140 can be one or more communications networks of any suitable type in any combination, including wireless networks, wired networks, local area networks, wide area networks, cellular data networks, and the internet.

The document storage and editing system 110 can be implemented in the form of one or more host computing devices 150 that implement a document storage system that is associated with a document editing system. These systems are associated at least by the ability of the document editing system to receive, view, edit and save documents that are stored at and/or managed by the document storage system. The document storage system and document editing system can be implemented by separate servers or groups of servers. The document storage system and the document editing system need not be physically co-located with one another, but rather, can be implemented by servers that are at remote locations with respect to each other, and which communicate via the network 140. The document storage system and the document editing system can be operated by a single entity or by different entities. In some implementations, the document storage and editing system 110 is part of a shared workspace in which documents can be edited collaboratively by multiple users who have been granted access to view and/or modify the documents by the owner of the documents. In some implementations, the document editing system can include multiple document editing systems that, for example, each perform a different type of editing task or are operable to edit different types of documents.

One or more items 152 can be stored at the document storage and editing system 110. As examples, the items 152 can include data files, documents such as word processing documents, spreadsheet documents, presentations, diagrams, images, video files, and audio files. One or more metadata attributes 154 can be associated with each of the items 152. As examples, the metadata attributes 154 can include the identities of one or more owners of the items 152, the identities of one or more collections in which the items 152 are included, the identities of non-owner third-party users that are allowed to view and/or access the items 152, and any other type of data that is or can be tracked with respect to the items 152.

Figure 2:
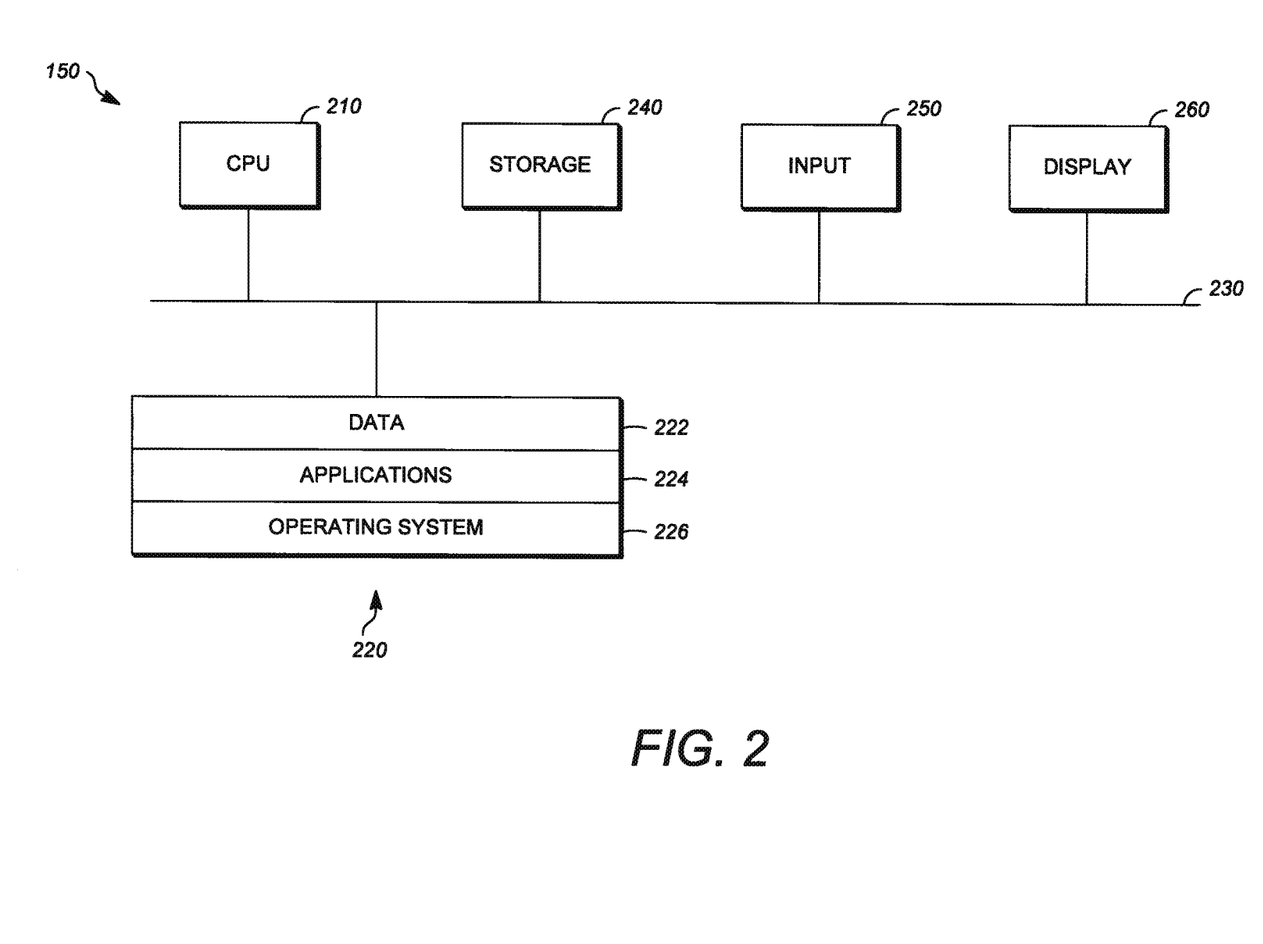
FIG. 2 is a block diagram showing an example of a host computer.

FIG. 2 is a block diagram of an example of a hardware configuration for the host computing device 150 that can be utilized to implement the document storage and editing system 110. The same hardware configuration or a similar hardware configuration can be used to implement the user system 120 and the third-party user systems 130. The host computing device 150 can include a CPU 210. The CPU 210 of the host computing device 150 can include one or more conventional central processing units. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

The host computing device 150 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disc drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 2 depicts the CPU 210 and the memory 220 of the host computing device 150 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines performing the operations of the host computing device 150. Although depicted here as a single bus, the bus 230 of each of the host computing device 150 can be composed of multiple buses. Further, the storage device 240 of each of the host computing devices 150 can be directly coupled to the other components of the respective one of the host computing devices 150 or can be accessed via a network and can comprise a single integrated unit such as a memory card or multiple units such as multiple memory cards. The host computing device 150 can thus be implemented in a wide variety of configurations.

Figure 3:
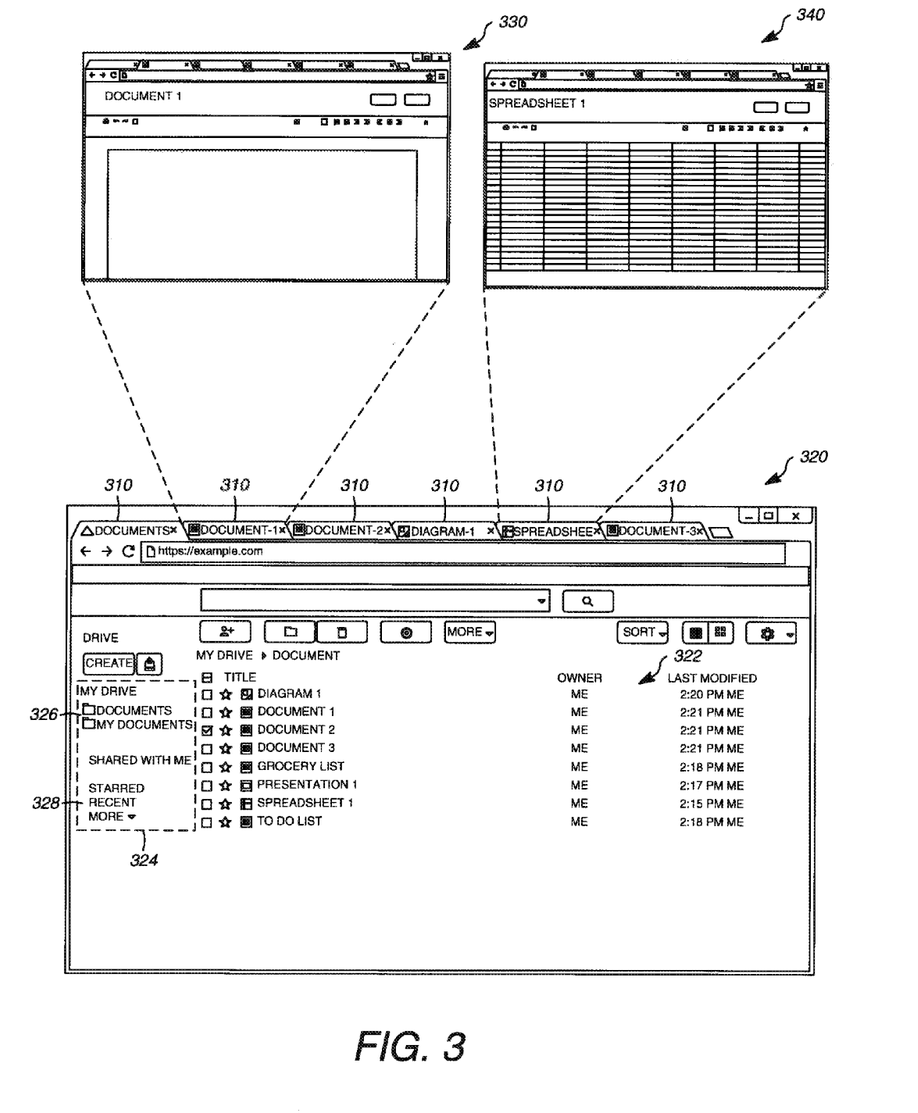
FIG. 3 is an illustration showing examples of user interface screens for the document storage and editing system.

FIG. 3 is an illustration showing examples of user interface screens for the document storage and editing system 110. In this example, the user interface screens are implemented in the form of web pages or web applications that are displayed in the context of an internet browser in which the document currently being viewed can be selected using a tab that represents the document. It should be understood that the systems and methods described herein need not be implemented in the form of web pages or web applications that are displayed in an internet browser with a tabbed view, but rather, can be implemented in any suitable form by which a user can access multiple documents.

In this example, a plurality of interface tabs 310 allow the user to switch the current view between a document list interface view 320 and a plurality of document editing interface views, such as a first document editing interface view 330 and a second document editing interface view 340.

The document list interface view 320 can include a document list 322 that displays a list of documents that are accessible by the user. The user can select one or more of the documents that is represented in the document list 322 in order to perform operations with respect to the document or documents, such as opening the document, moving the document into a folder, modifying a metadata attribute associated with the document, and/or deleting the document. Other types of operations could be performed with respect to the one or more selected documents in the context of the document list 322.

The document list interface view can include a navigation area 324. The navigation area 324 can include one or more user operable interface elements that allow the user to navigate between different views. For example, the navigation area 324 can include a first plurality of navigation buttons 326 that correspond to folder-based collections and cause the document list interface view 320 to display the documents associated with the respective folder-based collection when operated by the user. The navigation area 324 can also include one or more non-folder-based collection navigation buttons 328 that cause the document list interface view 320 to display one or more documents that are associated with a non-folder-based collection of one or more documents when operated by the user.

The first document editing interface view 330 and second document editing interface view 340 can each correspond to one of the documents that are represented in the document list 322. Each of the first document editing interface view 330 and the second document editing interface view 340 can include one or more user interface elements that can be utilized to view and/or edit the document. Examples of these user operable interface elements include scroll bars, text entry fields, and buttons that implement editing and/or formatting functions such as copying, pasting, highlighting, and text formatting.

The document storage and editing system 110 can receive and track usage pattern information that describes the actions that the user is performing with respect to one or more documents. This information can include the document being opened, the document being closed, information indicating that the document is being viewed, and information describing editing operations that are performed with respect to the document. The information indicating that the document is being viewed can represent any action or operation that is performed by the user and which provides a suitable basis from which to infer that the document is being viewed, such as a tab or window gaining focus, scrolling operations, highlighting operations, and editing operations. Editing operations can include any manner of action taken by the user with respect to the contents of the document including cut and paste operations, text entry operations, and formatting operations. Information regarding these operations can be received at the document storage and editing system 110 and can be stored as usage pattern information in association with time stamps or other information indicating the time at which the operations occurred.

Based at least in part on the usage pattern information for two or more of the documents, the document storage and editing system 110 can determine whether the two or more documents are likely to be related documents. The usage pattern information can be utilized as the sole basis for making this determination, or the usage pattern information can be considered in combination with other signals that provide a basis from which to infer that the documents are related documents.

Figure 4:
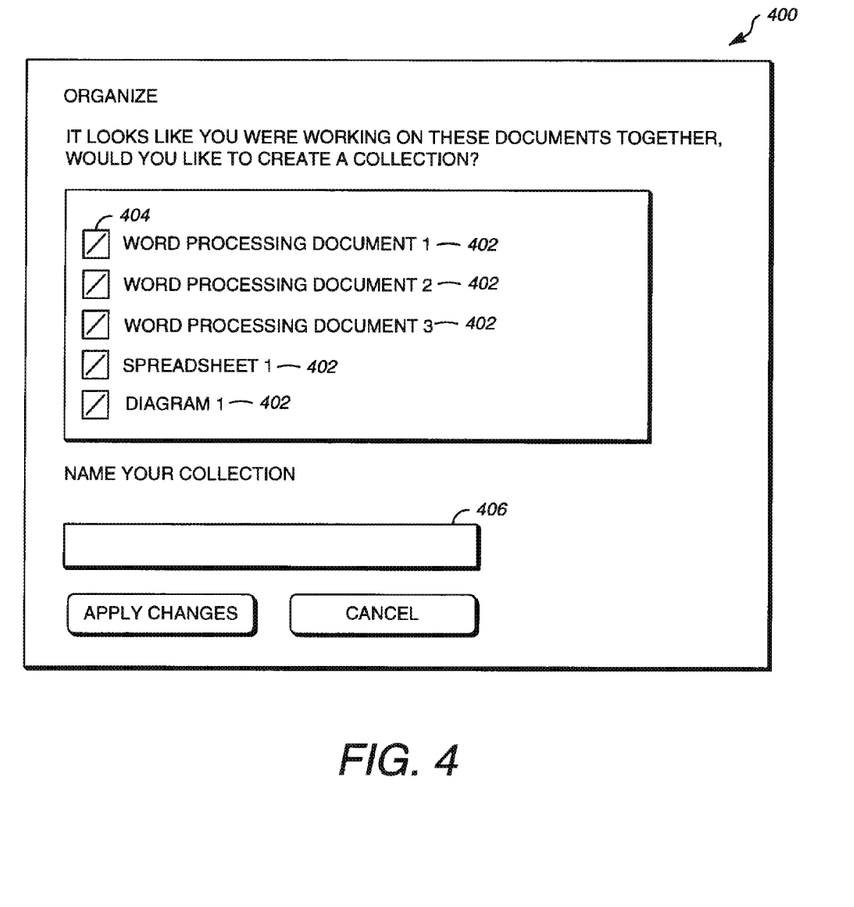
FIG. 4 is an illustration showing an example of a user interface screen for adding documents to a collection.

If the two or more documents are likely to be related documents, for example, when a likelihood that the two or more documents are related exceeds a threshold value, a collection including the two or more documents can be defined at the document storage and editing system 110. FIG. 4 is an illustration showing an example of a user interface screen 400 for adding the two or more documents to a collection. As an example, the user interface screen 400 can be displayed in the context of the document list interface view 320, as shown in FIG. 3. The user interface screen 400 can identify two or more documents that have been identified as related documents by displaying document identifiers 402. A removal interface element 404 can be associated with each of the document identifiers 402 in order to allow the documents that are associated with the document identifiers 402 to be excluded from the new collection. A text entry box 406 can be provided to allow the user to supply a name for the new collection. The user can then accept creation of the new collection or cancel creation of the new collection using buttons that are included in the user interface screen 400. In an alternative implementation, the user can be given the option of selecting an existing collection to which the related documents can be added.

Figure 5:
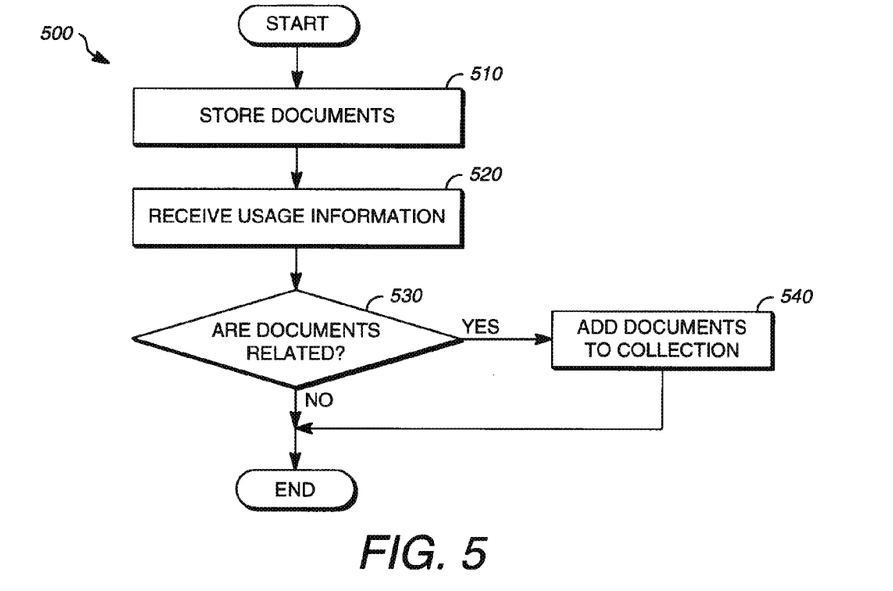
FIG. 5 is a flow chart showing an example of a process for identifying and organizing related documents.

FIG. 5 is a flow chart showing an example of a process 500 for identifying and organizing related documents. The operations described in connection with the process 500 can be performed at one or more computers, such as at the host computing device 150. When an operation is performed by one or more computers, it is completed when it is performed by one computer. The operations described in connection with the process 500 can be embodied as a non-transitory computer readable storage medium including program instructions executable by one or more processors that, when executed, cause the one or more processors to perform the operations. For example, the operations described in connection with the process 500 could be stored at the memory 220 of the host computing device 150 and be executable by the CPU 210 of the respective host computing device 150.

In operation 510, two or more documents are stored at the document storage and editing system 110. At operation 520, the document storage and editing system 110 receives usage pattern information regarding usage of the two or more documents that were stored at the document storage and editing system 110 in operation 510. The usage pattern information can include information representing transactions or events that occur with respect to the documents by one or more users, such as creating, accessing, viewing, and editing the documents. The usage pattern information can reflect the usage patterns of a single user with respect to the documents or can reflect the usage patterns of multiple users with respect to the documents. Usage pattern information can be collected independently for each document from the two or more documents.

At operation 530, a determination is made regarding whether the two or more documents are likely to be related. This determination can be made based at least in part on the usage pattern information. Other signals can be used as part of the basis for determining that the two or more documents are likely to be related documents. This determination can be made in any suitable matter. As one example, a rating can be made for each of a plurality of factors, including some factors that are based on the usage pattern information, a weighted average of those rankings can be made, and the documents can be determined to be related if the likelihood value exceeds a threshold value. Examples of processes for determining whether documents are likely to be related are described with respect to FIGS. 6-8.

If, at operation 530, it is determined that the documents are related documents, the process can advance to operation 540. At operation 540, the documents can be added to a collection. Adding the documents to a collection can include prompting the user to request confirmation that the documents are related documents prior to creating the collection, wherein the collection is created upon receiving confirmation from the user that the documents are related documents. Adding the documents to a collection can also include prompting the user for information describing the collection, such as a name. Adding the documents to a collection can also include identifying at least one existing collection that is associated with at least one of the documents, prompting the user to determine whether the documents should be added to the existing collection, and modifying the existing collection to include the documents upon receiving confirmation from the user that the documents should be added to the existing collection. As an example, an existing collection can be associated with a document when the document is already included in the existing collection. After the documents are added to a collection at operation 540, the process ends.

If, at operation 530, it is determined that the documents are not related documents, the process ends.

Figure 6:
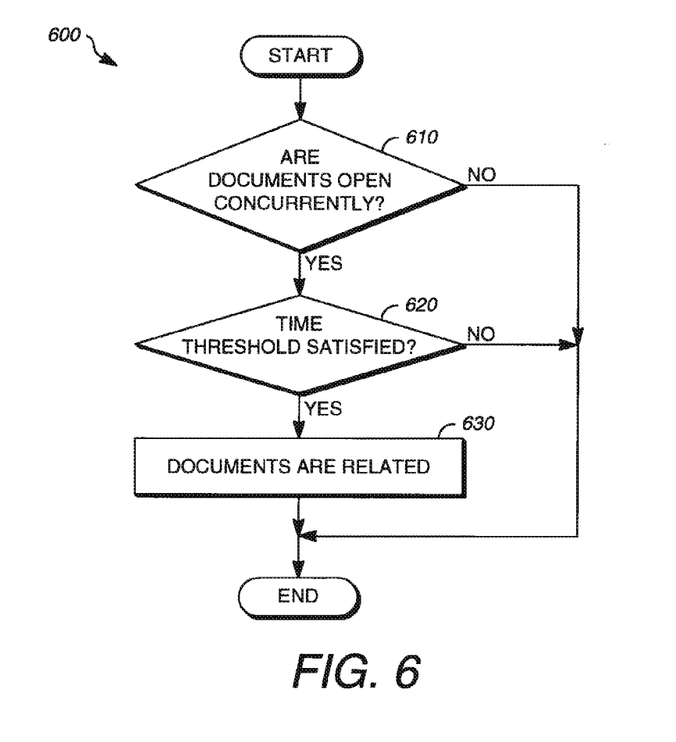
FIG. 6 is a flow chart showing a first example of a process for determining whether documents are related.

FIG. 6 is a flow chart showing a first example process 600 for determining whether documents are related. The first example process 600 can be utilized, for example, in the process 500 at operation 530. The first example process 600 can be applied to a pair of documents or to a group of three or more documents, either on an aggregate basis or on a pairwise basis.

The operations described in connection with the first example process 600 can be performed at one or more computers, such as at the host computing device 150. When an operation is performed by one or more computers, it is completed when it is performed by one computer. The operations described in connection with the first example process 600 can be embodied as a non-transitory computer readable storage medium including program instructions executable by one or more processors that, when executed, cause the one or more processors to perform the operations. For example, the operations described in connection with the first example process 600 could be stored at the memory 220 of the host computing device 150 and be executable by the CPU 210 of the respective host computing device 150.

At operation 610, a determination is made as to whether two or more documents are open concurrently by a single user at the document storage and editing system. If it is determined that two or more documents are not open concurrently by a single user, the process ends. If it is determined that two or more documents are open concurrently by a single user, the process advances to operation 620.

At operation 620, a determination is made as to whether a time threshold is satisfied with respect to two or more of the concurrently open documents. As one example, the threshold can exclude any individual document that has been open less than a threshold time. As another example, the threshold can be applied to exclude pairs of documents as potential related documents if they have been open concurrently by a single user for less than a threshold time. If the time threshold is not satisfied, the process ends. If the time threshold is satisfied, the process advances to operation 630.

At operation 630 the documents are identified as related documents. This determination can be utilized, for example, in the process 500 at operation 530. The process then ends.

Figure 7:
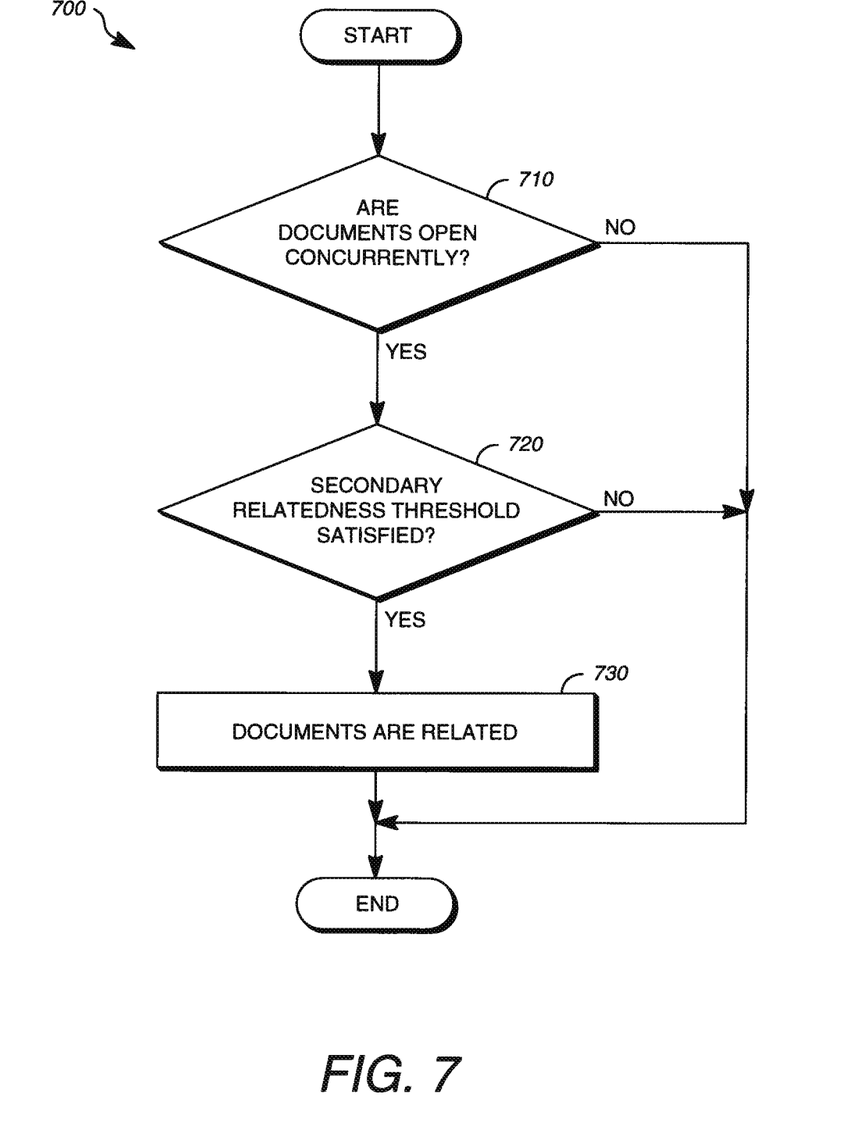
FIG. 7 is a flow chart showing a second example of a process for determining whether documents are related.

FIG. 7 is a flow chart showing a second example process 700 for determining whether documents are related. The second example process 700 can be utilized, for example, in the process 500 at operation 530. The second example process 700 can be applied to a pair of documents or to a group of three or more documents, either on an aggregate basis or on a pairwise basis.

The operations described in connection with the second example process 700 can be performed at one or more computers, such as at the host computing device 150. When an operation is performed by one or more computers, it is completed when it is performed by one computer. The operations described in connection with the second example process 700 can be embodied as a non-transitory computer readable storage medium including program instructions executable by one or more processors that, when executed, cause the one or more processors to perform the operations. For example, the operations described in connection with the second example process 700 could be stored at the memory 220 of the host computing device 150 and be executable by the CPU 210 of the respective host computing device 150.

At operation 710, a determination is made as to whether two or more documents are open concurrently by a single user at the document storage and editing system. If it is determined that two or more documents are not open concurrently by a single user, the process ends. If it is determined that two or more documents are open concurrently by a single user, the process advances to operation 720.

At operation 720, a determination is made as to whether a secondary relatedness threshold is satisfied. As one example, a secondary relatedness threshold can be satisfied where a threshold number of users are identified as collaborators with respect to each of the documents being considered. Users can be identified as collaborators, for example, if the users have been granted access to the document, if the users have accessed the document, and/or if the users have modified the document. As another example, a secondary relatedness threshold can be satisfied based on the content of the documents, such as the presence of common keywords or subject matter. If the secondary relatedness threshold is not satisfied, the process ends. If the secondary relatedness threshold is satisfied, the process advances to operation 730.

At operation 730 the documents are identified as related documents. This determination can be utilized, for example, in the process 500 at operation 530. The process then ends.

Figure 8:
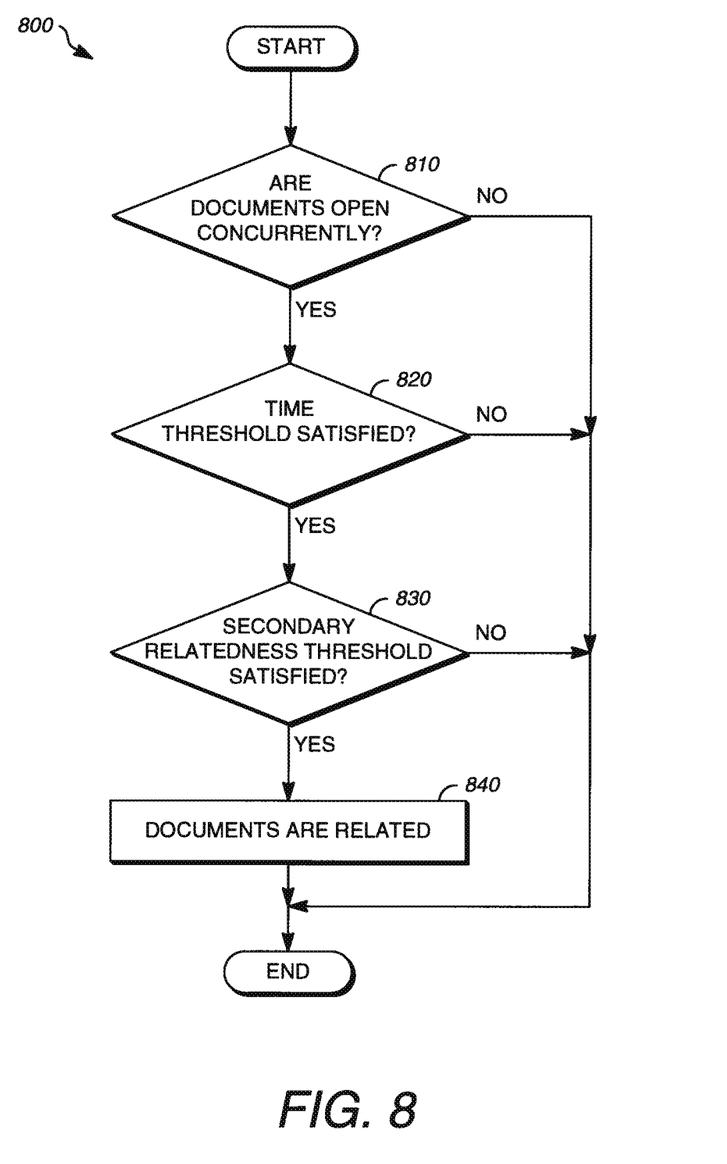
FIG. 8 is a flow chart showing a third example of a process for determining whether documents are related.

FIG. 8 is a flow chart showing a third example process 800 for determining whether documents are related. The third example process 800 can be utilized, for example, in the process 500 at operation 530. The third example process 800 can be applied to a pair of documents or to a group of three or more documents, either on an aggregate basis or on a pairwise basis.

The operations described in connection with the third example process 800 can be performed at one or more computers, such as at the host computing device 150. When an operation is performed by one or more computers, it is completed when it is performed by one computer. The operations described in connection with the third example process 800 can be embodied as a non-transitory computer readable storage medium including program instructions executable by one or more processors that, when executed, cause the one or more processors to perform the operations. For example, the operations described in connection with the third example process 800 could be stored at the memory 220 of the host computing device 150 and be executable by the CPU 210 of the respective host computing device 150.

At operation 810, a determination is made as to whether two or more documents are open concurrently by a single user at the document storage and editing system. If it is determined that two or more documents are not open concurrently by a single user, the process ends. If it is determined that two or more documents are open concurrently by a single user, the process advances to operation 820.

At operation 820, a determination is made as to whether a time threshold is satisfied with respect to two or more of the concurrently open documents. As one example, the threshold can exclude any individual document that has been open less than a threshold time. As another example, the threshold can be applied to exclude pairs of documents as potential related documents if they have been open concurrently by a single user for less than a threshold time. If the time threshold is not satisfied, the process ends. If the time threshold is satisfied, the process advances to operation 830.

At operation 830, a determination is made as to whether a secondary relatedness threshold is satisfied. As one example, a secondary relatedness threshold can be satisfied where a threshold number of users are identified as collaborators with respect to each of the documents being considered. Users can be identified as collaborators, for example, if the users have been granted access to the document, if the users have accessed the document, and/or if the users have modified the document. As another example, a secondary relatedness threshold can be satisfied based on the content of the documents, such as the presence of common keywords or subject matter. If the secondary relatedness threshold is not satisfied, the process ends. If the secondary relatedness threshold is satisfied, the process advances to operation 840.

At operation 840 the documents are identified as related documents. This determination can be utilized, for example, in the process 500 at operation 530. The process then ends.

In the first example process 600, the second example process 700 and the third example process 800, a determination is made as to whether documents are open concurrently, at operation 610, operation 710, and operation 810, respectively. As an alternative, usage information based criteria that include analyzing the usage pattern information regarding each document from two or more documents during a temporal window could be utilized in lieu of these operations. As one example, a beginning time and an ending time for a working session could be determined, and documents could be considered to be related if they are opened during the same working session. The beginning and ending times for a working session can be judged by any suitable criteria, such as the time period during which the user is logged in to the document storage system and/or the document editing system. As another example, the beginning time and the ending time for a working session can be judged based on the time period during which a user has any document open at the document storage system and/or the document editing system. As another alternative, usage information based criteria could include determining whether two or more documents have been viewed sequentially by a single user.

In the first example process 600, the second example process 700 and the third example process 800, the usage pattern information can be associated with a single user, or can be associated with a plurality of users.

In the first example process 600, the second example process 700 and the third example process 800, criteria relating to usage, collaborators, and document content are applied in the form of thresholds. In other implementations, these criteria can be applied in other manners. As an example, these criteria can be implemented in a factor-based analysis. In one example of a factor-based analysis, usage patterns, collaborators, document content, and other signals can each be modeled as a factor with a value ranging from a minimum to a maximum, based on the degree to which that individual factors indicate that the documents are likely to be related.

For example, instead of treating the fact that documents are open concurrently as a simple threshold, the value of a usage pattern based factor can be based on usage pattern information such as the number of document editing transactions that are performed with respect to each document within a temporal window. Some document editing transactions could be weighted differently than others. For example, a copy-and-paste operation the copies material from a first document into a second document can be weighted heavily in favor of a determination that the documents are related.

In a factor-based analysis, the factors can be combined, for example, by a weighted average, where the weighting factors are assigned in any desired manner, and represent, for example, an assessment of the probative value of the factor relative to whether the documents are related. The factors are then combined, and can be compared to a threshold value in order to determine whether the documents are related. The weightings and thresholds in a factor-based analysis can, but need not, be assigned such that a single factor is dispositive. For example, documents could be identified as related where the usage pattern information strongly suggests relatedness and no secondary relatedness factors are present.

As used herein, information, signals, or data are received by transmission or accessing the information, signals, or data in any form, such as receiving by transmission over a network, receiving by accessing from a storage device, or receiving by user operation of an input device.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
   storing, at a storage system, having one or more processors and one or more memory devices for storing program instructions used by the one or more processors, two or more documents, wherein each document from the two or more documents is stored by the storage system as an individual file that is able to be separately opened for editing;
   outputting, by the storage system and for display, a document list interface that includes a first plurality of document buttons that each correspond to a respective one of the two or more documents that are stored by the storage system, wherein user selection of one of the document buttons from the first plurality of document buttons causes usage of a respective document from the two or more documents by opening the respective document for editing at an editing system that implements document viewing and editing functions;
   identifying, by the storage system, a group of documents that are separately open for editing at the same time by a single user using the editing system, wherein the group of documents includes at least two documents from the two or more documents;
   determining whether the two or more documents are likely to be related documents includes analyzing the usage pattern information regarding each document from the two or more documents during a period of time;
   outputting a prompt for display to the single user, wherein the prompt requests a user input that identifies whether the group of documents should be added to a collection;
   in response to the user input from the single user confirming that the group of documents should be added to the collection, defining, at the storage system, the collection including each document from the group of documents; and
   defining, in the document list interface, a collection navigation button that is operable to cause display, in the document list interface, of information identifying the documents from the collection, the information including a second plurality of document buttons that each correspond to a respective one of the documents from the collection, wherein user selection of one of the document buttons from the second plurality of document buttons causes usage of a corresponding document from the collection by opening the corresponding document for editing at the editing system.

2. The method of claim 1, wherein determining whether the two or more documents are likely to be related documents includes identifying a beginning time and an ending time for a working session, and analyzing the usage pattern information regarding each document from the two or more documents during the working session.

3. The method of claim 1, wherein determining whether the two or more documents are likely to be related documents includes determining whether the two or more documents are being accessed concurrently by a single user.

4. The method of claim 1, wherein determining whether the two or more documents are likely to be related documents includes determining whether the two or more documents are being viewed sequentially by a single user.

5. The method of claim 1, wherein determining whether the two or more documents are likely to be related documents is based further in part on the identities of users that are collaborators for each document from the two or more documents.

6. The method of claim 1, wherein determining whether the two or more documents are likely to be related documents is based further in part on a comparison of content from each document from the two or more documents.

7. The method of claim 1, wherein the usage pattern information is associated with a single user.

8. The method of claim 1, wherein the usage pattern information is associated with a plurality of users.

9. The method of claim 1, wherein the usage pattern information describes document editing transactions that are performed at the editing system with respect to the two or more documents.

10. A non-transitory computer readable storage medium including program instructions executable by one or more processors that, when executed, cause the one or more processors to perform operations, the operations comprising:

storing, at a storage system, two or more documents, wherein each document from the two or more documents is stored by the storage system as an individual file that is able to be separately opened for editing;

outputting, by the storage system and for display, a document list interface that includes a first plurality of document buttons that each correspond to a respective one of the two or more documents that are stored by the storage system, wherein user selection of one of the document buttons from the first plurality of document buttons causes usage of a respective document from the two or more documents by opening the respective document for editing at an editing system that implements document viewing and editing functions;

identifying, by the storage system, a group of documents that are separately open for editing at the same time by a single user using the editing system, wherein the group of documents includes at least two documents from the two or more documents;

determining whether the two or more documents are likely to be related documents includes analyzing the usage pattern information regarding each document from the two or more documents during a period of time;

outputting a prompt for display to the single user, wherein the prompt requests a user input that identifies whether the group of documents should be added to a collection;

in response to the user input from the single user confirming that the group of documents should be added to the collection, defining, at the storage system, the collection including each document from the group of documents; and defining, in the document list interface, a collection navigation button that is operable to cause display, in the document list interface, of information identifying the documents from the collection, the information including a second plurality of document buttons that each correspond to a respective one of the documents from the collection, wherein user selection of one of the document buttons from the second plurality of document buttons causes usage of a corresponding document from the collection by opening the corresponding document for editing at the editing system.

11. The storage medium of claim 10, wherein determining whether the two or more documents are likely to be related documents includes identifying a beginning time and an ending time for a working session, and analyzing the usage pattern information regarding each document from the two or more documents during the working session.

12. The storage medium of claim 10, wherein determining whether the two or more documents are likely to be related documents includes determining whether the two or more documents are being accessed concurrently by a single user.

13. The storage medium of claim 10, wherein determining whether the two or more documents are likely to be related documents includes determining whether the two or more documents are being viewed sequentially by a single user.

14. The storage medium of claim 10, wherein determining whether the two or more documents are likely to be related documents is based further in part on the identities of users that are collaborators for each document from the two or more documents.

15. The storage medium of claim 10, wherein determining whether the two or more documents are likely to be related documents is based further in part on a comparison of content from each document from the two or more documents.

16. The storage medium of claim 10, wherein the usage pattern information describes document editing transactions that are performed at the editing system with respect to the two or more documents.

17. An apparatus, comprising:

one or more processors; and one or more memory devices for storing program instructions used by the one or more processors, wherein the program instructions, when executed by the one or more processors, cause the one or more processors to:

store, at a storage system, two or more documents, wherein each document from the two or more documents is stored by the storage system as an individual file that is able to be separately opened for editing;

output, by the storage system and for display, a document list interface that includes a first plurality of document buttons that each correspond to a respective one of the two or more documents that are stored by the storage system, wherein user selection of one of the document buttons from the first plurality of document buttons causes usage of a respective document from the two or more documents by opening the respective document for editing at an editing system that implements document viewing and editing functions;

identify, by the storage system, a group of documents that are separately open for editing at the same time by a single user using the editing system, wherein the group of documents includes at least two documents from the two or more documents;

determining whether the two or more documents are likely to be related documents includes analyzing the usage pattern information regarding each document from the two or more documents during a period of time;

output a prompt for display to the single user, wherein the prompt requests a user input that identifies whether the group of documents should be added to a collection;

in response to the user input from the single user confirming that the group of documents should be added to the collection, define, at the storage system, the collection including each document from the group of documents; and define, in the document list interface, a collection navigation button that is operable to cause display, in the document list interface, of information identifying the documents from the collection, the information including a second plurality of document buttons that each correspond to a respective one of the documents from the collection, wherein user selection of one of the document buttons from the second plurality of document buttons causes usage of a corresponding document from the collection by opening the corresponding document for editing at the editing system.

* * * * *